United States Patent [19]

Stackling

[11] Patent Number: 4,530,610
[45] Date of Patent: Jul. 23, 1985

[54] MULTIPLE-ROW ROLLER BEARING WITH A GUIDING RING

[75] Inventor: Håkan Stackling, Askim, Sweden

[73] Assignee: Aktiebolaget SKF, Gothenburg, Sweden

[21] Appl. No.: 544,793

[22] Filed: Oct. 24, 1983

[30] Foreign Application Priority Data

Dec. 13, 1982 [SE] Sweden .................................. 8207114

[51] Int. Cl.³ .............................................. F16C 33/51
[52] U.S. Cl. .................................... 384/560; 384/577; 384/579
[58] Field of Search ........... 308/202, 217, 218, 207 R, 308/201, 207 A; 384/560, 577, 579

[56] References Cited

U.S. PATENT DOCUMENTS 3,022,125  2/1962  Bratt et al. ........................ 308/217
4,199,203  4/1980  Pearson ............................. 308/217
4,239,304 12/1980  Wakunami ......................... 308/217

Primary Examiner—Lenard A. Footland
Attorney, Agent, or Firm—Eugene E. Renz, Jr.

[57] ABSTRACT

The invention related to a multiple-row roller bearing with a generally spherical outer ring raceway (2) and a guiding ring (5) between two rows of rollers, the guiding ring being centered in the bearing by contacting the outer ring raceway. In order to permit the part of the guiding ring which contact the rollers to be made of a material which is suitable from a wear and friction point of view, the guiding ring comprises an inner part (8) of such a suitable material. This part is closed and has a rotational symmetry, and its size allows it to be introduced into the outer ring of the bearing. An outer part (9) is arranged around the inner part and it can be mounted on the circumference of the inner part when the inner part is inserted in the outer ring of the bearing, whereby the outer ring fills up the space between the inner part and the raceway of the outer ring in at least some areas.

6 Claims, 3 Drawing Figures

MULTIPLE-ROW ROLLER BEARING WITH A GUIDING RING

BACKGROUND OF THE INVENTION

The invention relates to a multiple-row roller bearing and specifically to a two-row roller bearing assembly and a guide ring for guiding the rollers of the bearing.

Double-row self-aligning roller bearings with a spherical outer ring raceway are commonly designed in this way. A guiding ring which is centered in the outer ring of the bearing and guides the rollers of the rows of rollers which are adjacent the guiding ring gives a good roller guidance, which is important especially in bearings used in such applications in which the rollers are subjected to forces, such as acceleration forces, which tend to move them out of their desired position.

A guiding ring which is arranged between the rows of rollers and is centered by contacting the raceway of the outer ring must, in a bearing of the above mentioned kind, have a radial extension which exceeds the radial extension of the bore of the outer ring at the side planes of the outer ring. This fact makes it difficult to mount the guiding ring. One solution to this problem is to press the guiding ring diametrically into elliptical shape as much as its elasticity allows and introduce it into the bore of the outer ring with the longer axis of the ellipse coaxial to the bearing axis. This solution is possible only if the guiding ring is made of a material which permits a considerable elastic deformation. Such materials have, however, generally a poor wear resistance and unsuitable friction properties and are thus unsuitable as material in a guiding ring which rubs against the rollers in the bearing.

Another possible solution to the problem is to make the guiding ring in several pieces and put it together in place inside the outer ring of the bearing, whereby no part of the guiding ring has to be deformed during mounting. This solution has the disadvantage that the guiding ring easily gets unbalanced after mounting due to unavoidable manufacturing and mounting tolerances. Further, mounting is complicated and the contact between the ring and the rollers is imperfect.

A further solution is to provide the guiding ring with diametrically situated recesses in its periphery in order to make it possible to intrduce it into the bore of the outer ring without deforming it during mounting. The recesses, which usually consist of plane milled surfaces in the otherwise circular envelope surface, have a weakening effect on the guiding ring and tension concentrations occur in the region around the recesses when the guiding ring is subjected to forces.

SUMMARY OF THE INVENTION

The object of the present invention is to obtain a roller bearing according to the introduction of the specification, in which the above mentioned drawbacks are avoided, and this is achieved, according to the invention, by providing the bearing with a guiding ring which is characterized by novel features of construction and arrangement facilitating ease of assembly and providing accurate guidance for the rolling elements of the bearing assembly. To this end the inner annular member has rotational symmetry and is of a predetermined diametral dimension allowing assembly of the annular member into the outer ring of the bearing and an outer member is mountable on the peripheral surface of the inner annular member when the inner member is inserted in the outer ring of the bearing and fills the space between the inner annular member and the raceway of the outer ring at least in some of the annular areas.

Such a guiding ring can be made so that the surfaces which contact the rollers are of a material which is suitable regarding friction and wear, and unbalance problems are avoided by the fact that a portion of the ring consists of a closed part which is given an accurate and stable shape which is not changed during mounting.

BRIEF DESCRIPTION OF THE DRAWINGS

The invention is described in detail below with reference to the accompanying drawing, in which.

DESCRIPTION OF THE PREFERRED EMBODIMENTS

Figure 1:
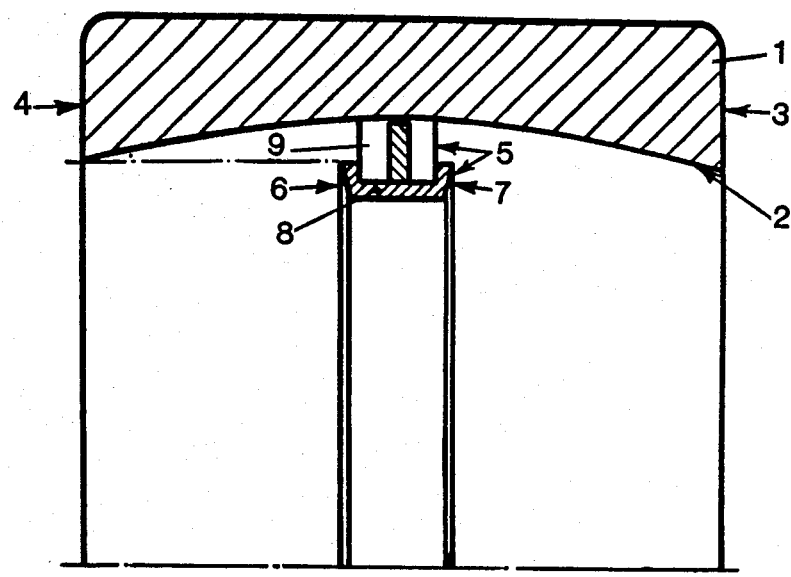
FIG. 1 shows an axial section of a bearing outer ring with a mounted guiding ring according to one embodiment of the invention.

In the bearing shown in FIG. 1, the inner ring and the two rows of rollers are omitted for the sake of clarity. The outer ring 1 is shown in a section in a plane comprising the bearing axis. The raceway 2 for the rollers is concave, the diameter in the area between the side surfaces 3, 4 of the ring being greater than the diameter at the side surfaces.

Usually the raceway is a spherical zone. A guiding ring 5 for guiding the rollers in the adjacent rows of rollers by contact between the end surfaces 6, 7 of the ring and the oppositely facing end surfaces of the rollers is placed in the axial middle portions of the bearing. The guiding ring is centered in the bearing by contacting the raceway of the outer ring, whereby the centres of the guiding ring 5 and the bearing ring 1 are always coinciding.

The guiding ring 5 comprises an inner, closed annular part 8 with a circular outline. The end surfaces 6, 7 of the guiding ring, which surfaces contact the rollers, are situated on this part of the guiding ring. The size of part 8 is such that the part can be introduced into the outer ring 1 of the bearing, possibly after a slight elastical oval squeezing of the part and/or the outer ring. Usually neither the outer ring 1 nor the guiding ring part 8 is elastically deformable to any appreciable extent, however, which means that the ring part 8 has a substantial play in relation to the raceway 2 of the outer ring when it is placed in a centered position half-way between the end surfaces 3, 4 of the outer ring. Therefore, the guiding ring also comprises an outer part 9, which can be mounted on the circumference of the inner part 8 when the inner part is placed inside the outer ring 1. The outer part 9 fills up the space between the inner part 8 and the raceway of the outer ring at least in some areas, whereby the guiding ring 5 is centered by the contact of the part 9 with the raceway 2.

Figure 2:
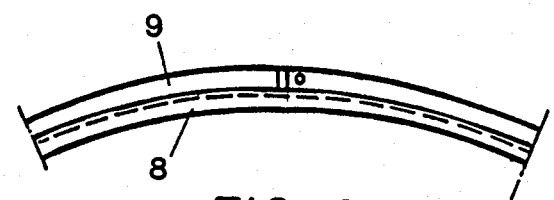
FIG. 2 shows a portion of a guiding ring according to one embodiment of the invention and FIG. 3 shows a portion of a guiding ring according to another embodiment of the invention.

The inner part 8 of the guiding ring is suitably solid and has a complete rotational symmetry. It can advantageously be made of gray cast iron, which is wear resistant and gives a low coefficient of friction in the contact against the steel of the end surfaces of the rollers. The outer part of the guiding ring can be made in a number of different ways. Since no part of its surface contacts the rollers, it can be assembled from a plurality of elements, which can be put together into a ring around the inner part 8. FIGS. 1 and 2 show a possible joint comprising a rivet or screw, in which a protruding portion of one element is inserted in a recess in the adjoining element, but of course other connecting methods are conceivable. The outer part 9 according to FIGS. 1 and 2 fills essentially the whole space between the inner part 8 and the outer raceway 2. The material of the part 9 is not critical regarding wear and friction properties, since, as a rule, the normal forces are small and the relative motions are slow in the contact between the part 9 and the raceway 2. The material is therefore suitably of the kind which allows the part 9 to be elastically deformed to a comparatively high degree, which simplifies mounting of the part 9 on the inner part 8. The elements of the part 9 can also be made of a more or less inelastic material if the elements are more than two in number.

Figure 3:
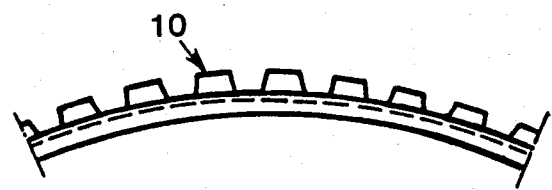

The outer part 9 can be made as a single element if it is elastically flexible. The flexible element may consist of an extended member arranged around the inner part 8. FIG. 3 shows a suitable embodiment of such a member, which has the shape of a corrugated spring 10, whose radially outwardly convex portions contact the raceway 2 of the outer ring and whose radially inwardly convex portions contact the inner part 8 of the guiding ring. Such a spring is easy to place around the part 8 when this part is placed in the outer ring 1 of the bearing.

In order to prevent the outer part 9 of the guiding ring from being axially displaced in relation to the inner part 8, a groove is preferably arranged about the circumference of the inner part 8, and the outer part 9 is placed in this groove. If, for example, a spring 10 is situated in such a groove, the abutting free ends of the spring which is arranged between the raceway 2 and the inner part 8 of the guiding ring need not be connected to each other.

Also other embodiments than the ones described above are conceivable within the scope of the claims. The outer part of the guiding ring may, for example, be provided with an inwardly open groove in which a portion of the inner part of the guiding ring is inserted. In case the outer part consists of a plurality of elements, these do not have to be mutually connected, but they can be individually fastened to the inner part, and if so, the elements may possibly be arranged at a considerable distance from each other. The surfaces 6, 7 of the part 8 may be conical or have a curved profile. Also bearings with more than two rows of rollers and more than one guiding ring may be made according to the invention.

I claim:

1. A multiple-row roller bearing including an outer ring having a spherical raceway wherein the diameter adjacent the axial end faces (3, 4) of the outer ring is greater than the diameter at the axial end faces, a guide ring assembly mounted between adjacent rows of rollers having means for centering the guide ring in the bearing by contact with the raceway of the outer ring and operable to guide the rollers in adjacent rows of rollers, said guide ring comprising an inner one-piece annular member having rotational symmetry and being of a predetermined maximum diametral dimension allowing assembly of the inner annular member into the outer ring of the bearing, said inner member being made of a wear resistant material having a low coefficient of friction and an outer member mountable on the peripheral surface of the inner annular member when the inner annular member is inserted in the outer ring of the bearing, said outer member centering and filling the space between the inner annular member and the raceway of the outer ring at least in some of the areas between the inner part and the outer raceway, said inner annular member being of U-shaped cross section and having upstanding leg portions wherein the outer circumferentially extending faces are of frusto-conical configuration and confront the axial end faces of the adjacent rows of rollers.

2. A roller bearing assembly as claimed in claim 1 wherein said outer member of said guide ring assembly comprises a plurality of elements and means for interconnecting these said elements to form a continuous assembly circumscribing the inner annular member.

3. A roller bearing assembly as claimed in claim 1, wherein the outer member comprises at least one elastically flexible element.

4. A roller bearing assembly as claimed in claim 3, wherein said flexible element consists of an elongated member arranged around the inner annular member.

5. A roller bearing assembly as claimed in claim 4, wherein the elongated member is a plied spring.

6. A multiple-row roller bearing including an outer ring having a spherical raceway wherein the diameter adjacent the axial end faces (3, 4) of the outer ring is greater than the diameter at the axial end faces, a guide ring assembly mounted between adjacent rows of rollers having means for centering the guide ring in the bearing by contact with the raceway of the outer ring and operable to guide the rollers in adjacent rows of rollers, said guide ring comprising an inner one-piece annular member having rotational symmetry and being of a predetermined maximum diametral dimension allowing assembly of the inner annular member into the outer ring of the bearing, said inner member being made of a wear resistant material having a low coefficient of friction and an outer member mountable on the peripheral surface of the inner annular member when the inner annular member is inserted in the outer ring of the bearing, said outer member centering and filling the space between the inner annular member and the raceway of the outer ring at least in some of the areas between the inner part and the outer raceway, said inner annular member having a circumferentially extending groove defining a seat for said outer member.

* * * * *